United States Patent Office 3,138,574
Patented June 23, 1964

3,138,574
PROCESS FOR THE POLYMERIZATION OF CAPROLACTAM WITH ACYLATING AGENTS AND UREAS AS COACTIVATORS
Melvin Ira Kohan, Wilmington, Del., assignor to E. I. du Pont de Nemours and Company, Wilmington, Del., a corporation of Delaware
No Drawing. Filed Apr. 6, 1961, Ser. No. 101,075
11 Claims. (Cl. 260—78)

This invention is concerned with a process for the anionic polymerization of lactams, and more particularly this invention is concerned with a process for fast polymerization of caprolactam catalyzed by an alkaline catalyst and carried out in the presence of certain pairs of co-catalysts which process produces polymers of superior color at a polymerization rate and set-up time faster than any previously known.

The polymerization of caprolactam to give a polycarboxylamide, 6-nylon, has been known for a number of years. The first processes described for this polymerization were slow processes requiring severa hours and involved small amounts of water or acidic reagents as catalysts for this polymerization. More recently, it has been found that anhydrous caprolactam could be polymerized at temperatures about 200° C. in the presence of strongly basic materials, particularly the alkali and alkaline earth metals, their hydrides, hydroxides, oxides and derivatives such as metal alkyls and metal amides. Still more recently, it has been disclosed that the alkalin-catalyzed polymerization of caprolactam can be made extraordinarily fast by the addition of certain co-catalysts derived from organic and inorganic acids. Particularly effective co-catalysts which have been disclosed include acylating agents and acyl compounds, for example, acyl halides, anhydrides, amides, imides, and the like. Other classes of co-catalysts which have been disclosed include isocyanates and substituted ureas.

It has been stated that some of the better of these co-catalysts, particularly the acylating agents, produce polymerization systems which are sufficiently rapid to make it possible to polymerize caprolactam from the liquid to the polymer in a mold by a casting technique whereby the polycaprolactam is rapidly prepared at temperatures below its melting point.

An early disclosure of the powerful accelerating effect of a co-catalyst in the polymerization of caprolactam is found in an article by H. K. Hall, Journal of the American Chemical Society, vol. 80, page 6040 (1958), where the polymerization was catalyzed by sodium hydride with N-acetylcaprolactam as the co-catalyst. The polymerization of pyrrolidone and piperidone in the presence of an alkali polymerization catalyst and a co-catalyst compound containing an acyl group which acts as an accelerator is described in U.S. Patent 2,739,959, issued March 27, 1956, to Ney and Crowther; in that case, the lactam was dispersed in an anhydrous non-solvent. Sebenda and Kralicek, in J. Chem. Listy, vol. 52, page 758 (1958); Chemical Abstracts, vol. 52, 12529 (1958), disclose the polymerization of caprolactam catalyzed by sodiocaprolactam in the presence of certain imide compounds. Barnes, Ney, and Nummy, in U.S. Patents 2,806,841, issued September 17, 1957, and 2,809,958, issued October 15, 1957, disclose the bulk polymerization of pyrrolidone and of α-piperidone in the presence of a polymerization catalyst and various acyl compounds acting as co-catalysts or accelerators. Australian Patent 228,445, accepted May 31, 1960, and Australian patent application 47,996/59, both in the name of the Monsanto Chemical Company, disclose the polymerization of caprolactam to polycaprolactam in the presence of a strongly basic catalyst capable of forming the iminium salt of caprolactam, including alkali metal and alkaline earth metal catalysts either in the metallic form or in the form of derivatives such as hydrides, hydroxides, amides, alkyls, aryls, borohydrides, and Grignard reagents; and co-catalysts comprising a tertiary nitrogen atom-containing compound free of primary amino groups and having at least two of three nitrogen substituents selected from the group consisting of carbonyl, thiocarbonyl, sulfonyl, phosphonyl, thiophosphonyl and nitroso radicals. Australian patent application 53,172/59, filed by the Monsanto Chemical Company, discloses the polymerization of lactams with at least six carbon atoms in the ring with anionic catalysts and various ureas and thioureas as co-catalysts.

Schwartz and Paul in a series of patents, German Patent 1,067,587, issued October 22, 1959; German 1,071,-946, issued December 24, 1959; and German 1,071,747, issued December 24, 1959, describe a one-step polymerization of lactams, with at least seven ring atoms, to polyamide shaped articles; these patentees show the use of an alkaline catalyst plus an acidic co-catalyst such as an acid halide, anhydride, ester, amide, or nitrile. The polymerization of lactams with more than six ring members by the use of an alkaline catalyst plus a co-catalyst such as an isocyanate, a carbobiimide, or cyanamide is disclosed in German Patent 1,067,591, issued October 22, 1959, to Schnell and Fritz.

In the course of an evaluation of the various processes disclosed by the prior art for the anionic polymerization of caprolactam, I have found certain deficiencies from the point of view of optimum commercial utility. Systems which give sufficiently rapid polymerization to be of some value in direct casting of shapes and polymerization of caprolactams in situ require quite high temperature or large concentrations of co-catalyst and produce polycaprolactam which is yellow. Some systems among those disclosed in the Australian Patent 228,445 produce polycaprolactam of better color but at the expense of conversion and at a rate too slow to be of value in such in situ casting operations. Therefore, it is an object of this invention to provide a process which will polymerize caprolactam at a rate faster than any process previously disclosed and will at the same time produce a polycaprolactam of superior whiteness. Other objects and advantages of this invention will appear hereinafter.

It has now been discovered in accordance with the objects of this invention that caprolactam can be polymerized to polycaprolactam of superior whiteness by an exceptionally rapid polymerization process which comprises heating caprolactam at a temperature above its melting point and below 225° C. with a basic catalyst and subsequently introducing a two-component co-catalyst comprising, as one component, an acylating agent or an N-acyl lactam, preferably N-acetyl caprolactam, and, as the second component, a 1,3-dialkyl urea or 1-acyl, 3-alkyl urea, preferably 1,3-dimethylurea, and subsequently heating the reaction mixture to a temperature above 100° C., preferably in the range of 120° to 200° C., and maintaining the catalyzed caprolactam at this temperature until the solidification time is reached.

The process of this invention converts caprolactam into solid, high-quality polycaprolactam more rapidly than any prior art process. The process of this invention enables caprolactam to be polymerized from the liquid state to a solid polymer much more rapidly than the processes of the prior art.

The anionic catalysts applicable to this invention are strong bases such as the alkali metal hydroxides including sodium hydroxide, potassium hydroxide, and lithium hydroxide, the alkaline earth hydroxides including magnesium hydroxide, calcium hydroxide, strontium hydroxide, and barium hydroxide, the hydrides of the alkali metals and of the alkaline earth metals, the metal alkyls such as butyl lithium, the alkali and alkaline earth metal amides, and, in fact, any base strong enough to convert caprolactam to its iminium salt.

The active or primary co-catalyst employed in the process of this invention comprise compounds capable of acylating caprolactam and N-acyl caprolactams. Specific examples of suitable acylating compounds include benzoyl chloride, acetyl chloride, propionyl chloride, butyryl chloride, terephthaloyl chloride, and acetic anhydride. The isocyanate co-catalysts known to the prior art are not effective in the process of this invention.

The unique second co-catalyst or additive required by the process of this invention is a 1,3-dialkyl urea or a 1-acyl, 3-alkyl urea, preferably 1,3-dimethylurea. Surprisingly, closely-related ureas such as 1,3-diphenylurea and tetramethyleneurea are ineffective in the process of this invention.

No polymerization occurs during the first step of the process of this invention wherein strongly basic material is reacted with caprolactam to produce the anionic catalyst at a temperature between the melting point of caprolactam and 225° C. The time required for this step in the process depends upon the strength of the base employed and upon the proportion added and may take from a few seconds to several hours. The caprolactam employed is essentially anhydrous, containing less than .1% water. The strong base is added in a proportion between 0.1 and about 10 mole percent, based on the caprolactam, depending upon the molecular weight desired; higher proportions of strong base produce lower molecular weight polycaprolactam. Optimum proportions of anionic catalyst are from 0.2 to 5 mole percent. The co-catalyst and suitable urea additive are added in proportions varying from about 0.1 mole percent to about 5 mole percent, based on the caprolactam; preferably the proportion of each co-catalyst is not more than ½ the mole percent of the anionic catalyst employed. The co-catalysts are employed together, usually in substantially equal proportions, but the mole ratio of the first component to the 1,3-dialkylurea or 1-aryl-3-alkylurea can be varied from about 4:1 to 1:4.

For optimum operation of the process of this invention, nitrogen gas may be bubbled through the molten caprolactam during the reaction with the basic catalyst in order to remove any low-molecular weight compound evolved, and in order to prevent oxidation. Alternatively, this reaction with the basic catalyst may be carried out under reduced pressure and the low molecular weight compound distilled out with some caprolactam.

The following examples are provided to illustrate preferred embodiments of the process of this invention and to show a comparison between the process of this invention and processes of the prior art. These examples are provided to illustrate the invention without any intention to limit it thereto.

EXAMPLES 1-7

In these examples, the following procedure was employed: 16 g. of caprolactam (containing less than .05% water) plus .08 g. (0.85 mole percent) of commercial, 85% KOH were charged to a glass tube and placed in a constant temperature bath at 120° C. Nitrogen was bubbled through the molten caprolactam at a rate of 350 cc. per minute. After 40 minutes at 120° C., during which time no polymerization occurred, the co-catalyst (0.2 mole percent) and, where an additive was employed, the additive (0.2 mole percent) where introduced; the bubbling of nitrogen through the melt was continued for 1 minute, and then the nitrogen inlet tube was raised so that the gas passed over the melt. The tube containing the homogeneous, bubble-free melt was transferred to a constant temperature bath maintained at 175° C. Except in the case of Example 2, where the slow rate of polymerization required a longer time at 175° C., the polymerizing mixture was maintained in the 175° C. bath for 10 minutes. During this time, the polymerizing mixture was observed, and the length of time at 175° C. when the first turbidity due to crystallization occurred, was noted, as was the length of time at 175° C. required for complete solidification of the whole polymerizing mass. After completion of the reaction at 175° C., the tube was removed from the bath, dried, and cooled to room temperature. The color of the polymer produced was observed. The polymer was evaluated by determination of its relative viscosity measured as a 0.42 wt. percent solution in 90% formic acid at 25.0° C. The percent extractables (percent E) was determined as weight percent of the total product which could be extracted with boiling water in a period of 24 hours; for this extraction, the polymer was broken up into 20-mesh granules. Examples 1 to 7 are tabulated in Table I.

Table I

ANIONIC POLYMERIZATION OF CAPROLACTAM (0.85 MOLE PERCENT KOH)

| Example No. | Co-Catalyst (0.2 mole percent) | Additive (0.2 mole percent) | Time at 175° to Crystallization Point (min.) | Time at 175° to Complete Solidification (min.) | Total Time at 175° (min.) | Color of Polymer | $\eta_r$ | Percent E |
|---|---|---|---|---|---|---|---|---|
| 1 | Benzoyl chloride | | 6 | 9 | 10 | Lt. yellow | 3.7 | 5.2 |
| 2 | 1,3-Dimethylurea | | 33 | 37 | 40 | White | 1.6 | 19.3 |
| 3 | Benzoyl chloride | 1,3-Dimethylurea | 2.5 | 3 | 10 | Off-white | 2.0 | 3.1 |
| 4 | N-acetylcaprolactam | | 5 | 8 | 10 | Yellow | 3.6 | |
| 5 | do | 1,3-Dimethylurea | 0.5 | 3 | 10 | Lt. cream | 2.0 | |
| 6 | N-Benzoylcaprolactam | | 7.5 | 10 | 10 | Yellow | 3.6 | |
| 7 | do | 1,3-Dimethylurea | 3 | 3.5 | 10 | Lt. cream | 2.0 | |

The data in Table I clearly show that the process of this invention is surprisingly more rapid than the prior art processes, while giving a high-quality polycaprolactam. The additive 1,3-dimethylurea, while effective as a co-catalyst itself, wtih anionic-catalyzed polymerization of caprolactam, provides a very slow rate of polymerization and a lower molecular weight product with a high percent E, which reflects a lower conversion. Commercial utility of polycaprolactam requires that the percent extractables be low, and this is another unexpected advantage of the process of this invention, since the combination of the co-catalyst and 1,3-dimethylurea additive produces a polycaprolactam with a lower percent extractables than is obtained with the use of an active co-catalyst alone. Experiments similar to Example 1 but with the use of increased concentration of benzoyl chloride produced lower rates of reaction than shown in Example 1. Experiments similar to Examples 4 and 6 but employing higher concentrations of the N-acyl caprolactam gave higher initial rates of reaction but no increase in rate of solidification and the polymers had higher color; the product became even deeper yellow than in Examples 4 and 6.

In the following examples (Examples 8 to 16, tabulated in Table II) 16 g. of caprolactam (containing less than 0.05% water) plus 0.065 g. (0.85 mole percent) of NaOCH$_3$ were charged to a glass tube and placed in a constant temperature bath at 150° C. Nitrogen was bubbled through the molten caprolactam at a rate of 350 cc. per minute for 20 minutes during which time no polymerization occurred. The co-catalyst and additive, if also used, were then introduced, and the bubbling continued for 10–30 seconds. The nitrogen inlet tube was raised and the flow of nitrogen adjusted to 80 cc./min. The homogeneous melt rapidly degassed and became bubble-free. The melt was mantained at 150° C. and observed as described in Examples 1–7 above. Zero time was taken to the time of introduction of the co-catalyst and additive.

Note that increasing the concentration of N-acetylcaprolactam from 0.2 to 0.6 (Examples 8 and 13) lowered the time required for solidification from 7.5 to 4.5 minutes but yielded a polymer of poorer color and lower molecular weight. The polymerization making use of 1,3-dimethylurea with only 0.2% N-acetylcaprolactam (Example 10) required but 3.5 minutes to solidify and gave much better color. A result similar to that obtained with 1,3-dimethylurea was obtained in the polymerization in which 1-acetyl, 3-methylurea was employed as additive (Example 16).

*Table II*

ANIONIC POLYMERIZATION OF CAPROLACTAM (0.85 MOLE PERCENT NaOCH₃)

| Example No. | Co-Catalyst (0.2 mole percent) | Additive (0.2 mole percent) | Time at 175° to Crystallization Point (min.) | Time at 175° to Complete Solidification (min.) | Total Time at 175° (min.) | Color of Polymer | $\eta_r$ | Percent E |
|---|---|---|---|---|---|---|---|---|
| 8 | N-acetylcaprolactam | | 6 | 7.5 | 10 | Lt. yellow | 5.6 | 5.1 |
| 9 | 1,3-Dimethylurea | | 43 | 50 | 50 | White | 1.1 | 60.6 |
| 10 | N-acetylcaprolactam | 1,3-Dimethylurea | 3 | 3.5 | 10 | Lt. cream | 2.4 | 3.2 |
| 11 | N,N'-terephthaloylbis-caprolactam | | 5 | 8.5 | 10 | Strong yellow | gel | 5.5 |
| 12 | ...do... | 1,3-Dimethylurea | 2.5 | 3.5 | 10 | Moderately yellow | 2.8 | 3.3 |
| 13 | N-acetylcaprolactam (1) | | 3.5 | 5 | 10 | ...do... | 3.4 | |
| 14 | ...do... | 1,3-Dimethylurea | 2 | 2.5 | 10 | Lt. yellow | 2.3 | |
| 15 | N-acetylcaprolactam (2) | | 2.5 | 4.5 | 10 | Yellow | 2.5 | |
| 16 | ...do... | 1-Acetyl, 3-methylurea | 3.5 | 4.5 | 10 | Cream | 2.4 | |

(1)=0.4 mole percent; (2)=0.6 mole percent.

All of the products of the process of this invention were evaluated and found to be tough and commercially-useful products, with good impact resistance. These polymers can be molded into tough shaped articles such as radio cabinets, housings for electrical appliances, handles, and other hardware fixtures. The particular utility of this invention, however, is found in applications where the caprolactam is polymerized in situ either as a shaped article, with or without an inert solid filler, a coating, or as an impregnation of a fibrous web.

I claim:
1. A process for the rapid polymerization of caprolactam to solid polycaprolactam which comprises heating caprolactam at a temperature above its melting point and below 225° C. with from 0.1 to 10 mole percent of a strong base selected from the group consisting of the alkali metal bases and the alkaline earth bases to produce the caprolactiminium ion as anionic catalyst and subsequently adding a two-component co-catalyst mixture comprising, as the first component, from 0.1 to 5 mole percent of a co-catalyst selected from the group consisting of acylating agents of the class consisting of carboxylic acid chlorides and carboxylic acid anhydrides, and the N-acyl lactams derived by reaction of said acylating agents with a lactam, and as the second component, from 0.1 to 5 mole percent of a urea derivative selected from the group consisting of 1,3-dimethylurea and 1-acetyl-3-methylurea, and subsequently heating this reaction mixture to a temperature in the range of 100° C. to 200° C. until the polymer solidifies.

2. A process according to claim 1 in which the strong base is sodium methoxide.

3. A process according to claim 1 in which an inert gas is passed through the molten caprolactam during the reaction with the strong base while caprolactam is maintained at a temperature above its melting point and below 225° C.

4. A process for the rapid polymerization of caprolactam to solid polycaprolactam which comprises heating caprolactam for from 10 to 120 minutes at a temperature above its melting point and below 225° C. with from 0.5 to 2.0 mole percent of an alkali metal base to produce the caprolactiminium ion as anionic catalyst and subsequently adding a two-component co-catalyst mixture comprising, as the first component, from 0.1 to 1.0 mole percent of a co-catalyst selected from the group consisting of acylating agents of the class consisting of carboxylic acid chlorides and carboxylic acid anhydrides, and the N-acyl lactams derived by reaction of said acylating agents with a lactam and, as the second component, from 0.1 to 1.0 mole percent of a urea derivative selected from the group consisting of 1,3-dimethylurea and 1-acetyl-3-methylurea and subsequently heating this reaction mixture to a temperature in the range of 100° to 200° C. until the polymer solidifies.

5. A process according to claim 4 in which an inert gas is passed through the molten caprolactam during the reaction with the alkali metal base while the caprolactam is maintained at a temperature above its melting point and below 225° C.

6. A process according to claim 4 in which the alkali metal base is potassium hydroxide.

7. A process according to claim 4 in which the first component of the two-component co-catalyst mixture is benzoyl chloride.

8. A process according to claim 4 in which the first component of the two-component co-catalyst mixture is N-benzoylcaprolactam.

9. A process according to claim 4 in which the first component of the two-component co-catalyst mixture is N-acetylcaprolactam.

10. A process according to claim 4 in which the alkali metal base is sodium methoxide.

11. A process according to claim 4 in which the first component of the two-component co-catalyst mixture is N,N'-terephthaloylbiscaprolactam.

References Cited in the file of this patent

UNITED STATES PATENTS

| | | |
|---|---|---|
| 3,015,652 | Schnell et al. | Jan. 2, 1962 |
| 3,017,391 | Mottus et al. | Jan. 16, 1962 |
| 3,017,392 | Butler et al. | Jan. 16, 1962 |
| 3,018,273 | Butler et al. | Jan. 23, 1962 |
| 3,042,659 | Follett | July 3, 1962 |
| 3,060,153 | Follett | Oct. 23, 1962 |
| 3,086,962 | Mottus et al. | Apr. 23, 1963 |

UNITED STATES PATENT OFFICE
CERTIFICATE OF CORRECTION

Patent No. 3,138,574   June 23, 1964

Melvin Ira Kohan

It is hereby certified that error appears in the above numbered patent requiring correction and that the said Letters Patent should read as corrected below.

Column 1, line 22, for "severa" read -- several --; line 26, for "about" read -- above --; line 30, for "alkalin-catalyzed" read -- alkaline-catalyzed --; column 2, line 24, for "carbobiimide" read -- carbodiimide --; column 4, line 48, for "wtih" read -- with --; column 5, line 6, for "was taken to the time" read -- was taken to be the time --.

Signed and sealed this 29th day of December 1964.

(SEAL)
Attest:

ERNEST W. SWIDER
Attesting Officer

EDWARD J. BRENNER
Commissioner of Patents